United States Patent [19]

Ferm

[11] Patent Number: 4,551,226

[45] Date of Patent: Nov. 5, 1985

[54] HEAT EXCHANGER ANTIFOULANT

[75] Inventor: Richard L. Ferm, Lafayette, Calif.

[73] Assignee: Chevron Research Company, San Francisco, Calif.

[21] Appl. No.: 352,818

[22] Filed: Feb. 26, 1982

[51] Int. Cl.$^4$ .............................................. C10G 9/16
[52] U.S. Cl. ............................... 208/48 AA; 585/950
[58] Field of Search .................... 208/48 AA; 585/950

[56] References Cited

U.S. PATENT DOCUMENTS

| | | | |
|---|---|---|---|
| 2,446,969 | 8/1948 | Welch et al. | 208/48 AA |
| 2,965,685 | 12/1960 | Campbell | 585/4 |
| 3,148,225 | 9/1964 | Albert | 585/4 |
| 3,265,752 | 8/1966 | Whiton et al. | 585/4 |
| 3,371,124 | 2/1968 | Albert et al. | 585/4 |
| 3,426,063 | 2/1969 | Gros | 585/5 |
| 3,763,018 | 10/1973 | Raff et al. | 208/48 AA |
| 3,878,181 | 4/1975 | Mayer-Mader et al. | 526/295 X |
| 4,200,518 | 4/1980 | Mulvaney | 208/48 AA |
| 4,237,326 | 12/1980 | Fuga et al. | 208/48 AA |
| 4,440,625 | 4/1984 | Go et al. | 208/48 AA |

Primary Examiner—William R. Dixon, Jr.
Assistant Examiner—Cynthia A. Prezlock
Attorney, Agent, or Firm—S. R. LaPaglia; J. M. Whitney; J. J. DeYoung

[57] ABSTRACT

Disclosed is a process for reducing the fouling in a heat exchanger in which a hydrocarbon stream is heated or cooled as it passes through the heat exchanger. From 1 to 500 parts per million of an organic hydroxylamine is added to the stream to reduce fouling.

12 Claims, No Drawings

HEAT EXCHANGER ANTIFOULANT

BACKGROUND OF THE INVENTION

The invention relates to heat exchangers, particularly heat exchangers used in the processing of crude oil. More particularly, the invention relates to an additive for reducing heat exchanger fouling.

In the processing of petroleum, numerous heat exchangers are utilized to heat or cool process streams. Since refineries typically process very large quantities of petroleum ranging from 25,000 to 200,000 or more barrels per day, the heat exchangers in the refinery represent a very large capital investment. After a period of operation, deposits build up on the heat exchanger tubes greatly reducing heat exchanger efficiency and greatly increasing the energy consumed. Eventually, the heat exchanger must be taken out of operation and the tubes cleaned or replaced. Increasing heat exchanger efficiency and reducing the amount and rate of fouling can provide tremendous energy savings in refineries and other facilities that use heat exchangers.

DESCRIPTION OF THE PRIOR ART

Numerous heat exchanger antifoulant additives are well known in the art, for example, U.S. Pat. No. 3,442,791 discloses an antifoulant additive for petroleum hydrocarbons comprising a disalicylidene propane diamine and an alkylphenol or alkylphenol-formaldehyde condensate. Similarly, U.S. Pat. No. 4,200,518 discloses the use of a polyalkyleneamine as a heat exchanger antifoulant additive.

SUMMARY OF THE INVENTION

A process for reducing heat exchanger fouling in which a liquid hydrocarbon stream is passed through a heat exchanger at a temperature from 0° to 1500° F. wherein from 1 to 500 parts per million of an antifoulant additive is added to said hydrocarbon stream, said additive comprising an organic hydroxylamine.

DETAILED DESCRIPTION OF THE INVENTION

The heat exchangers utilized in the present invention are of any type where deposits accumulate on a heat transfer surface. The most common type of heat exchanger used is commonly known as a shell and tube heat exchanger.

The hydrocarbon stream passing through the heat exchanger is preferably a crude oil stream. Particularly preferred are petroleum stocks that contain reactive hydrocarbons such as olefins, sulfur, and nitrogen compounds. However, any hydrocarbon stream which leads to fouling of the heat exchanger can be utilized in the present invention, particularly various fractions of the crude oil. Generally, the streams passing through the heat exchanger will be heated or cooled at temperatures ranging from 0° to 1500° F., preferably 50° to 800° F.

THE ORGANIC HYDROXYLAMINES

Any organic hydroxylamine which prevents fouling can be used in the present invention. Preferred are the N,N-dihydrocarbylhydroxylamines with 1 to 18 carbon atoms in the hydrocarbyl group and more preferably 1 to 8 carbon atoms in the hydrocarbyl group. Representative hydrocarbyl groups include alkyl, arylalkyl, alkylaryl, aryl, cycloalkyl, alkylene, and heterocyclic groups. More preferred are the N,N-dialkylhydroxyl-amines with 1 to 10 and preferably 2 to 6 carbon atoms in each alkyl group. Most preferred is N,N-diethylhydroxylamine. The organic hydroxylamines are generally commercially available or can be readily synthesized by any skilled chemist. Representative hydroxylamines include: N,N-dimethylhydroxylamine, N,N-diethylhydroxylamine, N,N-dipropylhydroxylamine, N,N-dibutylhydroxylamine, N,N-diamylhydroxylamine, N,N-dihexylhydroxylamine, N,N-dioctylhydroxylamine, N,N-dicyclohexylhydroxylamine, N-hydroxylpiperdine, N-hydroxylmorpholine, N-hydroxyldiethyleneimide sulfide, N,N-diallylhydroxylamine, N,N-dibenzylhydroxylamine, and N,N-di-2-propyn-1-hydroxylamine.

To substantially reduce heat exchanger fouling, an effective amount, generally from 1 to 500 parts per million, preferably 5 to 99 parts per million, and most preferably 10 to 49 parts per million of the above-described hydroxylamine is added to the stream passing through the heat exchanger. One surprising feature of the present invention resides in the finding that such small quantities of the above-described additive are effective in reducing heat exchanger fouling.

EXAMPLES 1-6

Antifouling Tests

Various compounds, including numerous commercial heat exchange antifoulants and the organic hydroxylamines of the present invention were tested for their antifouling characteristics using a standard ALCOR Test Apparatus. This test involves feeding a test stock material at a fixed rate and for a fixed period of time and at constant inlet temperature into a tube containing a stainless steel electrically heated rod while supplying enough heat to the rod to maintain the outlet temperature of the test stock constant. As fouling deposits form on the rod, the temperature of the rod must be increased to maintain a constant outlet temperature of the test stock. The initial rod temperature and final rod temperature are measured along with the initial and final weight of the rod. The increase in rod temperature and the amount of deposits on the rod are indicative of the degree and rate of fouling.

Eact test run was for three hours and either no additive was used or 50 parts per million of additive was added to the test stock. The inlet temperature of the test stock was maintained at 70° F. and the outlet temperature was maintained at 600° F. for the hydrotreater and hydrofiner feedstocks and at 500° F. for the Eastern Wyoming Crude oil stock. The results are shown below in Table I.

TABLE I

| Test No. | Test Base Stock and Additive | ΔT, °F. | Deposit Wt, mg |
|---|---|---|---|
| | Naphtha Hydrotreater Feedstock | | |
| 1 | No Additive | 4 | 15.3 |
| 2 | N,N—Diethylhydroxylamine | −1 | 8.5 |
| 3 | Diethylamine | 8 | 11.4 |
| 4 | 2,4-Dimethyl-6-tbutyl Phenol (DuPont Antioxidant No. 30) | 12 | 0.2 |
| 5 | Oronite ORA 502[1] | 2 | 16.0 |
| 6 | Exxon Corexit 214[2] | −2 | 12.4 |
| 7 | Betz Petromeen AF-111[3] | 23 | 6.8 |
| 8 | Betz Petromeen AF-114[4] | 10 | 10.6 |
| 9 | Nalco 262[5] | 394 | 16.9 |
| | Diesel Hydrofiner Feedstock | | |
| 10 | No Additive | 43 | 4.0 |
| 11 | N,N—Diethylhydroxylamine | 5 | 5.8 |

TABLE I-continued

| Test No. | Test Base Stock and Additive | ΔT, °F. | Deposit Wt, mg |
|---|---|---|---|
| 12 | Oronite ORA 502[1] Eastern Wyoming Crude Oil | 44 | 3.5 |
| 13 | No Additive | 11 | 6.0 |
| 14 | N,N—Diethylhydroxylamine | 1 | 6.8 |
| 15 | Oronite ORA 502[1] | 56 | 2.6 |
| 16 | Exxon Corexit[6] | 97 | 2.9 |

[1]A polyisobutylene amine having a molecular weight of approximately 1000 to 2000.
[2]Believed to be a mixture of polyamine phenolic resin and borated amide.
[3]Believed to be a mixture of phenolic amine polymers, substituted polymeric amides, and heterocyclic amides in heavy aromatic naphtha.
[4]Believed to be a mixture of substituted polymeric amides in heavy aromatic naphtha.
[5]Believed to be an ethylene-diamine salt of an organic sulfonic acid.
[6]Believed to be a mixture of polyamine-amides and fatty acid alkenols-amine esters.

The above data indicates that the organic hydroxylamines of the present invention are generally superior as an antifouling agent compared to the other related compounds and commercial additives tested.

What is claimed is:

1. A process for reducing heat exchanger fouling in which a liquid hydrocarbon stream is passed through a heat exchanger at a temperature from 0° to 1500° F. wherein from 1 to 500 parts per million of an anti-fouling additive is added to said hydrocarbon stream, said additive consisting essentially of an organic hydroxylamine wherein said hydroxylamine is an N,N-dialkylhydroxylamine and wherein said stream is crude oil or a fraction thereof.

2. The process of claim 1 wherein said N,N-dialkylhydroxylamine has 2 to 6 carbon atoms in the alkyl group.

3. The process of claim 2 wherein 5 to 99 parts per million of said additive are added to said stream.

4. The process of claim 3 wherein said hydrocarbon stream is passed through said heat exchanger at a temperature from 50° to 800° F.

5. The process of claim 2 wherein said organic hydroxylamine is N,N-diethylhydroxylamine.

6. The process of claim 5 wherein said heat exchanger is a shell and tube heat exchanger.

7. A process for reducing heat exchanger fouling in which a liquid hydrocarbon stream is passed through a heat exchanger at a temperature from 0° to 1500° F. wherein from 1 to 500 parts per million of an antifouling additive is added to said hydrocarbon stream, said additive consisting essentially of an organic hydroxylamine wherein said hydroxylamine is an N,N-dialkylhydroxylamine and wherein said stream is crude oil and said stream is heated in said heat exchanger.

8. The process of claim 7 wherein said N,N-dialkylhydroxylamine has 2 to 6 carbon atoms in the alkyl group.

9. The process of claim 8 wherein 5 to 99 parts per million of said additive are added to said stream.

10. The process of claim 9 wherein said hydrocarbon stream is passed through said heat exchanger at a temperature from 50° to 800° F.

11. The process of claim 10 wherein said organic hydroxylamine is N,N-diethylhydroxylamine.

12. The process of claim 11 wherein said heat exchanger is a shell and tube heat exchanger.

* * * * *